US009515944B2

(12) United States Patent
Tatsumi et al.

(10) Patent No.: US 9,515,944 B2
(45) Date of Patent: Dec. 6, 2016

(54) TRAIN INFORMATION MANAGEMENT APPARATUS AND TRAIN INFORMATION MANAGEMENT METHOD

(75) Inventors: Shogo Tatsumi, Tokyo (JP); Takashi Miyauchi, Tokyo (JP); Toshiko Kadono, Tokyo (JP); Tetsuo Komura, Tokyo (JP); Shingo Honda, Tokyo (JP); Takuya Sawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 276 days.

(21) Appl. No.: 14/359,348

(22) PCT Filed: Dec. 12, 2011

(86) PCT No.: PCT/JP2011/078678
§ 371 (c)(1),
(2), (4) Date: May 20, 2014

(87) PCT Pub. No.: WO2013/088491
PCT Pub. Date: Jun. 20, 2013

(65) Prior Publication Data
US 2014/0301400 A1    Oct. 9, 2014

(51) Int. Cl.
*H04L 12/801* (2013.01)
*B61L 99/00* (2006.01)
(Continued)

(52) U.S. Cl.
CPC .......... *H04L 47/34* (2013.01); *B61L 15/0036* (2013.01); *B61L 25/028* (2013.01); *B61L 99/00* (2013.01)

(58) Field of Classification Search
CPC ....................................... H04L 47/34
See application file for complete search history.

(56) References Cited

U.S. PATENT DOCUMENTS 4,596,013 A * 6/1986 Tashiro ............. H04L 12/43
370/452

5,583,849 A    12/1996 Ziemann et al.
(Continued)

FOREIGN PATENT DOCUMENTS

CN    101094156 A    12/2007
JP    61-169040 A    7/1986
(Continued)

OTHER PUBLICATIONS

Office Action (The First Office Action) issued on Apr. 28, 2015, by the Chinese Patent Office in corresponding Chinese Patent Application No. 201180075421.5, with an English translation of the Office Action. (16 pages).

(Continued)

*Primary Examiner* — Mohamed Kamara
*Assistant Examiner* — Thad Defauw
(74) *Attorney, Agent, or Firm* — Buchanan Ingersoll & Rooney PC

(57) ABSTRACT

A train information management apparatus includes a first system central device that generates first train control information for a car-mounted device in every predetermined period and a second system central device that generates second train control information starting from the time at which the time obtained by multiplying the predetermined period with 1/2 has elapsed from the time point when the first train control information is transmitted. The first system central device generates a first packet every time the first train control information is generated and alternately transmits a first packet to a first system trunk transmission line and a second system trunk transmission line. The second system central device generates and transmits a second packet almost in the same manner except that the second packet is transmitted to a trunk transmission line on the opposite side of the trunk transmission line to which the first packet was transmitted.

16 Claims, 9 Drawing Sheets

(51) Int. Cl.
    *B61L 15/00*     (2006.01)
    *B61L 25/02*     (2006.01)

(56) References Cited

U.S. PATENT DOCUMENTS

| | | | |
|---|---|---|---|
| 7,577,668 B2 * | 8/2009 | Sato | B60L 15/42 |
| 8,027,258 B2 | 9/2011 | Mizutani et al. | |
| 8,422,375 B2 | 4/2013 | Mizutani et al. | |
| 2004/0252688 A1 * | 12/2004 | May | H04L 12/42 |
| | | | 370/389 |
| 2007/0268913 A1 * | 11/2007 | Denecheau | H04L 12/1854 |
| | | | 370/397 |

FOREIGN PATENT DOCUMENTS

| | | |
|---|---|---|
| JP | 1-175338 A | 7/1989 |
| JP | 5-56048 A | 3/1993 |
| JP | 7-170278 A | 7/1995 |
| JP | 8-223185 A | 8/1996 |
| JP | 9-162904 A | 6/1997 |
| JP | 2002-26934 A | 1/2002 |
| JP | 2002-247037 A | 8/2002 |
| JP | 2002-335251 A | 11/2002 |
| JP | 2004-172943 A | 6/2004 |
| JP | 2005-39783 A | 2/2005 |
| JP | 2010-16691 A | 1/2010 |
| WO | WO 2011/074147 A1 | 6/2011 |

OTHER PUBLICATIONS

*International Search Report (PCT/ISA/210) mailed on Mar. 13, 2012, by the Japanese Patent Office as the International Searching Authority for International Application No. PCT/JP2011/078678.
*Written Opinion (PCT/ISA/237) mailed on Mar. 13, 2012, by the Japanese Patent Office as the International Searching Authority for International Application No. PCT/JP2011/078678.

* cited by examiner

TRAIN INFORMATION MANAGEMENT APPARATUS AND TRAIN INFORMATION MANAGEMENT METHOD

FIELD

The present invention relates to a train information management apparatus and a train information management method.

BACKGROUND

In recent years, a train is mounted with a train information management apparatus that monitors operation states of train mounted devices (hereinafter referred to as "devices") such as a brake and an air conditioner and individually controls the operations of the devices.

The train information management apparatus includes, for example, a central device and a terminal device. The terminal device collects operation state information of the devices and transmits the collected operation state information to the central device. In general, the central device manages and controls the devices according to the collected operation state information. The central device is connected to a control operation device such as a master controller (a master control device). The central device performs arithmetic processing on the basis of notch information or the like input from the control operation device, generates train control information, which is a control command signal related to control of the entire train, and transmits the train control information to terminal devices. The terminal device transmits the train control information received from the central device to the devices. Each of the devices operates according to the data concerning each device (device data) in the train control information. The device data from the central device is transmitted to the devices in this way, whereby efficient operation of the train is realized. Therefore, it is an important object from the viewpoint of comfortable and efficient operation of the train to improve reliability of a transmission system including the train information management apparatus.

From such a viewpoint, for example, in the related art described in Patent Literature 1, central devices are doubled and configured such that a slave system (second system) central device is triggered by an interruption of the transmission from a master system (first system) central device to start transmission of the train control information.

CITATION LIST

Patent Literature

Patent Literature 1: Japanese Patent Application Laid-Open No. H01-175338

SUMMARY

Technical Problem

However, the related art described in Patent Literature 1 has a problem in that switching from the first system central device to the second system central device cannot be instantaneously performed. For example, in a method of the related art, the first system central device, which is a master station in common use, and the second system central device, which is an auxiliary master station, are connected to a transmission line, when the first system central device is not out of order, data transmission is performed from the first system central device onto a transmission line, and, when the first system central device fails and the data transmission is interrupted, the data transmission is performed from the second system central device, which has detected the failure, onto the transmission line. However, timing when an entity of the data transmission is switched from the first system central device to the second system central device is after timeout when a fixed time has elapsed from a point when the second system central device cannot receive data from the first system central device. Therefore, there is a problem in that a time lag occurs from the failure occurrence until the completion of the switching.

As a method of reducing such a time lag, for example, a method is conceivable in which the first system central device and the second system central device monitor their respective soundness and, when a failure of the first system central device is detected, the first system central device is switched to the second system central device at a sufficiently short interval. However, in this method, it is necessary to add anew a transmission line for monitoring the soundness. There is a problem in that, when the monitoring is performed using an existing transmission line (e.g., a trunk transmission line) without using the new transmission line, an increase in traffic of the transmission line is caused.

The present invention has been devised in view of the above and it is an object of the present invention to obtain a train information management apparatus and a train information management method capable of transmitting train control information without increasing the traffic of doubled trunk transmission lines.

Solution to Problem

In order to solve the aforementioned problems, a train information management apparatus according to one aspect of the present invention is configured to include: a first information transmitting unit connected to a first trunk transmission line disposed across a plurality of cars, which configure a formation of a train, and a second trunk transmission line disposed across a plurality of cars, which configure the formation of the train, and forming a redundant system of the first trunk transmission line, the first information transmitting unit including a first train-control-information generating unit configured to generate, based on control input information including notch information, first train control information serving as a control command signal for a receiving device mounted on the car and a first packet generating unit configured to generate, every time the first train control information is generated, a first packet in which a sequence number has been given to the first train control information and alternately transmit, in the every predetermined period, the first packet to the first trunk transmission line and the second trunk transmission line; and a second information transmitting unit connected to the first trunk transmission line and the second trunk transmission line, the second information transmitting unit including a second train-control-information generating unit configured to generate second train control information, which is train control information same as or different from the first train control information, based on the control input information starting from the time at which the time obtained by multiplying the predetermined period with 1/2 has elapsed from a time point at which the first train control information was transmitted, and a second packet generating unit configured to generate, every time the second train control information is generated, a second packet in which a sequence number has been given to the second train control information and transmit, in the every predetermined period, the second packet to a trunk transmission line on the opposite side of the trunk transmission line to which the first packet was transmitted.

According to the present invention, the packets of the train control information to which the sequence numbers are given are alternately transmitted from the two train information central device to the double trunk transmission lines. Therefore, there is an effect that it is possible to transmit the train control information without increasing the traffic of the doubled trunk transmission lines.

DESCRIPTION OF EMBODIMENTS

Embodiments of a train information management apparatus and a train information management method according to the present invention are explained in detail below based on the drawings. Note that the present invention is not limited by the embodiments.

First Embodiment

Figure 1:
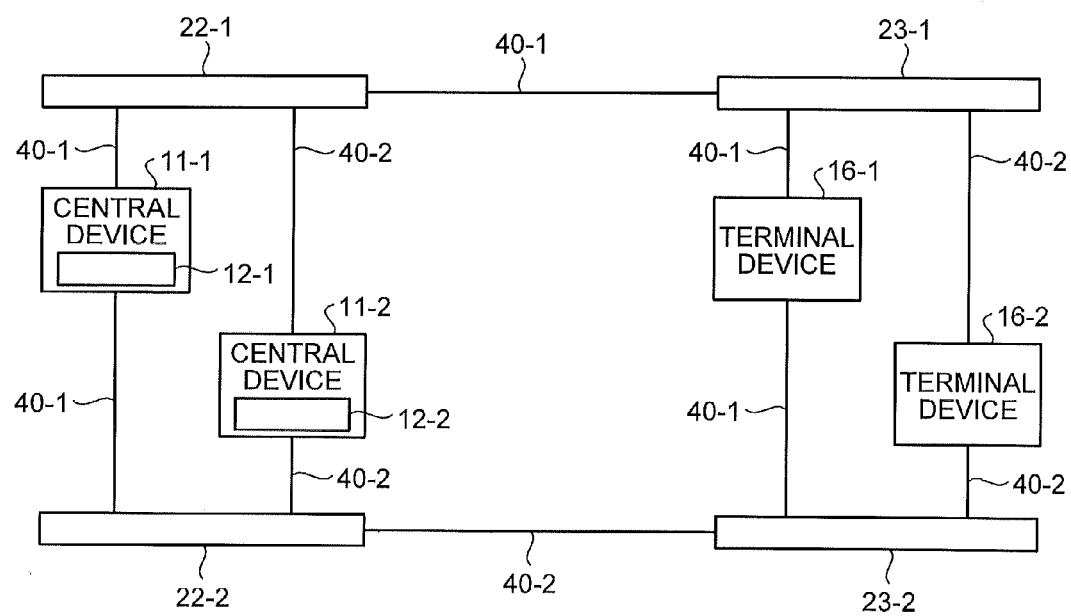
FIG. 1 is a diagram schematically showing a train information management apparatus according to a first embodiment of the present invention.

FIG. 1 is a diagram schematically showing a train information management apparatus according to a first embodiment of the present invention. In FIG. 1, a first system trunk transmission line (a first trunk transmission line) 40-1, which is a trunk transmission line of a master system, and a second system trunk transmission line (a second trunk transmission line) 40-2, which is a trunk transmission line of a subordinate system, are disposed. The first system trunk transmission line 40-1 and the second system trunk transmission line 40-2 configure a trunk network and are, for example, LAN (local area network) trunk lines formed using an Ethernet (registered trademark). Note that the number of cars is not limited to the example shown in the figure.

The first car is mounted with a first system central device 11-1, which is a central device of a master system configuring the train information management apparatus, and a second system central device 11-2, which is a central device of a subordinate system configuring the train information management apparatus. The first system central device 11-1 and the second system central device 11-2 are respectively connected to the first system trunk transmission line 40-1 and the second system trunk transmission line 40-2 via a hub 22-1 and a hub 22-2. The first system central device 11-1 includes a first system transmission control unit 12-1. The second system central device 11-2 includes a second system transmission control unit 12-2. Note that details of the first system transmission control unit 12-1 and the second system transmission control unit 12-2 are explained later on.

A car other than the first car is mounted with a terminal device 16-1 and a terminal device 16-2 configuring the train information management apparatus. The terminal devices 16-1 and 16-2 are respectively connected to the first system trunk transmission line 40-1 and the second system trunk transmission line 40-2 via a hub 23-1 and a hub 23-2.

In an intra-car transmission system shown in FIG. 1, a second system of the second system central device 11-2, the terminal device 16-2 and the like form a redundant system of a first system of the first system central device 11-1, the terminal device 16-1 and the like, and perform the same operation under the same configuration. Under such a configuration of a double system, for example, information and the like from devices (not shown in the figure) such as a VVVF, a SIV, a brake, and an air conditioner are output to the first system trunk transmission line 40-1 and the second system trunk transmission line 40-2, whereby redundancy increases and higher reliability is obtained.

The train information management apparatus manages various kinds of train information such as train control information related to control of an entire train such as train operation information, train position information, a power running command, a brake command, and a door opening and closing command and operation state information of devices. The first system central device 11-1, the second system central device 11-2, the terminal device 16-1, and the terminal device 16-2 operate in cooperation with one another, collect information concerning devices respectively connected to the devices, and share the information via the first system trunk transmission line 40-1 and the second system trunk transmission line 40-2.

The first system transmission control unit 12-1 and the second system transmission control unit 12-2 are now explained.

Figure 2:
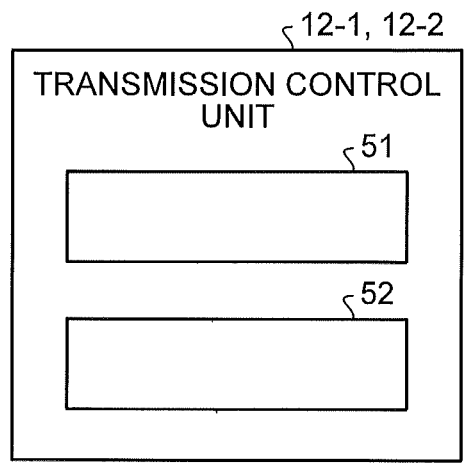
FIG. 2 is a diagram showing the configuration of a first system transmission control unit and a second system transmission control unit shown in FIG. 1.

FIG. 2 is a diagram of the configuration of the first system transmission control unit 12-1 and the second system transmission control unit 12-2 shown in FIG. 1. Each of the first system transmission control unit 12-1 and the second system transmission control unit 12-2 includes a train-control-information generating unit 51 and a packet generating unit 52 as main components.

The train-control-information generating unit (a first train-control-information generating unit) 51 in the first system transmission control unit 12-1 generates, based on the control input information explained above, a first train control information, which is a control command signal to the devices and the terminal devices 16-1 and 16-2.

For example, when a first piece of first train control information is generated, the packet generating unit (a first packet generating unit) 52 in the first system transmission control unit 12-1 generates a first packet A1 in which a sequence number is given to the first train control information. The sequence number is a cyclic number for uniquely identifying the first train control information. The packet generating unit 52 transmits the first packet A1 to, for example, the first system trunk transmission line 40-1.

When a second piece of first train control information is generated, the packet generating unit 52 in the first system transmission control unit 12-1 gives a number obtained by adding 1 to the preceding sequence number to the first train control information and generates a first packet A2. The first packet A2 is transmitted to a trunk transmission line (e.g., the second system trunk transmission line 40-2) on the opposite side of a trunk transmission line to which the first packet A1 was transmitted. In this way, the packet generating unit 52 in the first system transmission control unit 12-1 increments the sequence number by 1 every time the first train control information is generated, generates, as the first packets A1 and A2, the packets in which the sequence number has been given to the first train control information, and transmits the packets to the first system trunk transmission line 40-1 or the second system trunk transmission line 40-2.

Thereafter, the packet generating unit 52 in the first system transmission control unit 12-1 generates, every time the first train control information is generated, the first packets A1 and A2 to which a number obtained by adding 1 to the preceding sequence number has been given. The generated first packets A1 and A2 are transmitted to a trunk transmission line on the opposite side of a trunk transmission line to which the preceding first packets A1 and A2 were transmitted. Note that a period from the transmission of the first packet A1 until the first packet A2 is transmitted and a period from the transmission of the first packet A2 until the first packet A1 is transmitted are both predetermined period T1.

Subsequently, the train-control-information generating unit (a second train-control-information generating unit) 51 in the second system transmission control unit 12-2 generates second train control information, which is information same as the first train control information, based on the control input information starting from the time at which a half time of the period T1 has elapsed from a time point at which the first packet A1 was transmitted.

For example, when a first piece of second train control information is generated, the packet generating unit (a second packet generating unit) 52 in the second system transmission control unit 12-2 generates a second packet B2 in which a sequence number has been given to the second train control information. The packet generating unit 52 transmits the second packet B2 to, for example, the second system trunk transmission line 40-2.

When a second piece of second train control information is generated, the packet generating unit 52 in the second system transmission control unit 12-2 gives a number obtained by adding 1 to the preceding sequence number to the second train control information and generates a second packet B1. The packet generating unit 52 transmits the second packet B1 to a trunk transmission line (e.g., the first system trunk transmission line 40-1) on the opposite side of the trunk transmission line to which the second packet B2 was transmitted. In this way, the packet generating unit 52 in the second system transmission control unit 12-2 increments the sequence number by 1 every time the second train control information is generated, generates, as the second packets B1 and B2, packets in which the sequence number has been given to the second train control information, and transmits the packets to the first system trunk transmission line 40-1 or the second system trunk transmission line 40-2.

Thereafter, the packet generating unit 52 in the second system transmission control unit 12-2 generates, every time the second train control information is generated, the second packets B1 and B2 to which a number obtained by adding 1 to the preceding sequence number has been given. The packet generating unit 52 transmits the second packets B1 and B2 to a trunk transmission line on the opposite side of a trunk transmission line to which the preceding second packets B1 and B2 were transmitted. Note that a period from the transmission of the second packet B2 until the second packet B1 is transmitted and a period from the transmission of the second packet B1 until the second packet B2 is transmitted are both predetermined period T2.

The overall operation of the train information management apparatus in the first embodiment is explained below.

Control input information (e.g., notch information of a master controller) is input to the first system central device 11-1 and the second system central device 11-2. The first system transmission control unit 12-1 generates first train control information based on the control input information. Similarly, the second system transmission control unit 12-2 generates second train control information based on the control input information. The first train control information and the second train control information are information concerning, for example, distribution of a brake force to a brake control device and distribution of power running torque to a VVVF inverter. Sequence numbers are respectively given to the first train control information and the second train control information. Packets to which the sequence numbers are given are transmitted to the terminal device 16-1 and the terminal device 16-2 via the first system trunk transmission line 40-1 and the second system trunk transmission line 40-2. These packets are transmitted to devices (not shown in the figure) via the transmission line 40-1 and the transmission line 40-2.

The terminal devices 16-1 and 16-2 that have received the packets, for example, transmit the train control information in the packets to the devices (not shown in the figure). The terminal devices 16-1 and 16-2 collect operation state information data output from the devices (not shown in the figure) and periodically transmit the data to the first system central device 11-1 and the second system central device 11-2 and the like.

The train control information output from the first system central device 11-1 and the second system central device 11-2 is specifically explained.

Figure 3:
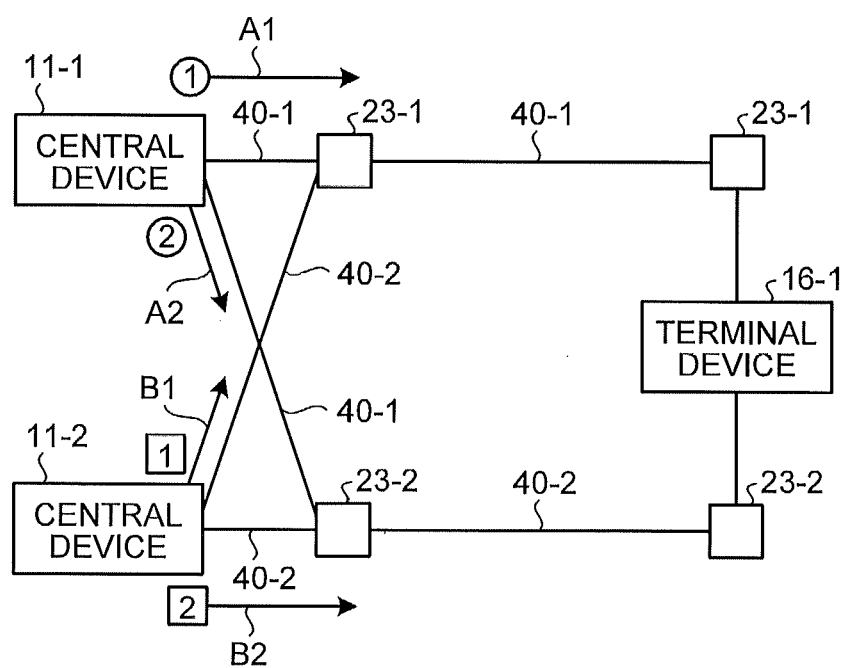
FIG. 3 is a diagram schematically showing packets transmitted from a central device to a trunk transmission line.

FIG. 3 is a diagram schematically showing the packets transmitted from the central devices to the trunk transmission lines. In FIG. 3, the first system central device 11-1 and the second system central device 11-2 shown in FIG. 1 are shown and paths through which the first packets A1 and A2 from the first system central device 11-1 are transmitted and paths through which the second packets B1 and B2 from the second system central device 11-2 are transmitted are shown. These paths are configured by, for example, the hub 23-1, the hub 23-2, the first system trunk transmission line 40-1, the second system trunk transmission line 40-2, the hub 23-1, and the hub 23-2.

The first packet A1 from the first system central device 11-1 is transmitted to the first system trunk transmission line 40-1. The second packet B1 from the second system central device 11-2 is also transmitted to the first system trunk transmission line 40-1. The first packet A2 from the first system central device 11-1 is transmitted to the second system trunk transmission line 40-2. The second packet B2 from the second system central device 11-2 is also transmitted to the second system trunk transmission line 40-2.

Figure 4:
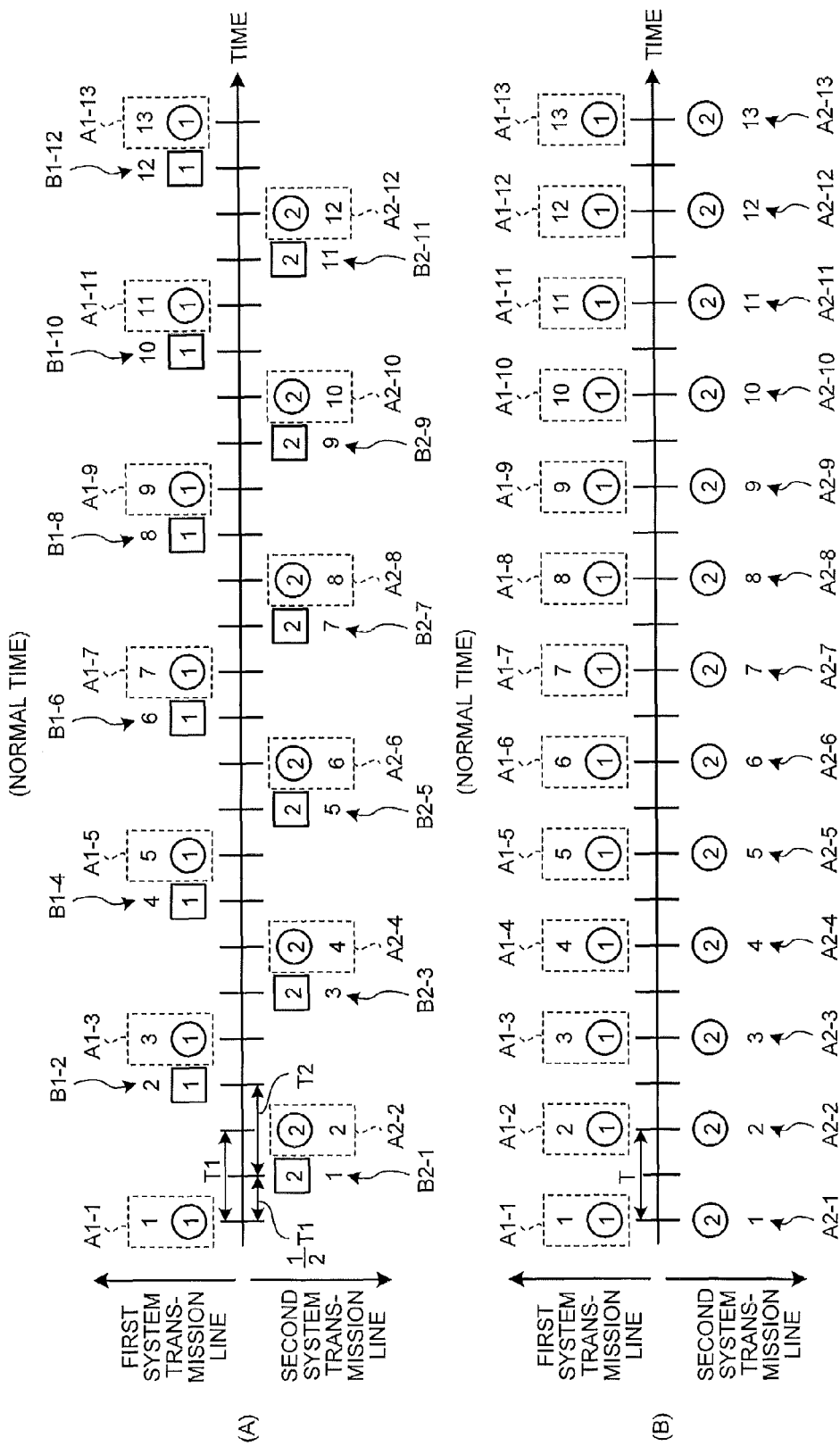
FIG. 4 is a diagram explaining the operation of the train information management apparatus according to the first embodiment of the present invention.

FIG. 4 is a diagram explaining the operation of the train information management apparatus according to the first embodiment of the present invention.

In FIG. 4(A), the first packets A1 and A2 and the second packets B1 and B2 generated by the train information management apparatus according to the first embodiment are shown. For example, on the upper side of FIG. 4(A), the first packet A1 and the second packet B1 transmitted to the first system trunk transmission line 40-1 are shown. On the lower side of FIG. 4(A), the second packet B2 and the first packet A2 transmitted to the second system trunk transmission line 40-2 are shown.

The first system central device 11-1 generates a first packet A1-1 in which a sequence number "1" has been given to first train control information "1" generated at a predetermined time. The first system central device 11-1 transmits the first packet A1-1 to, for example, the first system trunk transmission line 40-1.

Subsequently, when the time obtained by multiplying the period T1 with 1/2 has elapsed from a time point at which the first packet A1-1 was transmitted, in the second system central device 11-2, second train control information "2" is generated and a second packet B2-1 in which the sequence number "1" same as the sequence number of the first packet A1-1 has been given to the second train control information "2" is generated. The second train control information "2" has same content as that of the first train control information of the first packet A1-1. The second packet B2-1 is transmitted to a trunk transmission line (the second system trunk transmission line 40-2) on the opposite side of the trunk transmission line to which the first packet A1-1 was transmitted.

Subsequently, after the period T1 has elapsed from the time point at which the first packet A1-1 was generated, in the first system central device 11-1, first train control information "2" is generated and a first packet A2-2 in which a sequence number "2" obtained by adding 1 to the sequence number "1" of the first packet A1-1 has been given to the first train control information "2" is generated. The first system central device 11-1 generates the first train control information "2" is generated anew based on the control input information. The first packet A2-2 is transmitted to a trunk transmission line (the second system trunk transmission line 40-2) on the opposite side of the trunk transmission line to which the first packet A1-1 was transmitted the period T1 earlier.

Subsequently, after the period T2 has elapsed from the time point at which the second packet B2-1 was generated, in the second system central device 11-2, second train control information "1" is generated and a second packet B2-1 in which the sequence number "2" obtained by adding 1 to the sequence number of the second packet B2-1 has been given to the second train control information "1" is generated. The second train control information "1" has same content as that of the first train control information of the first packet A2-2. Then, the packet B1-2 is transmitted to a trunk transmission line (e.g., the first system trunk transmission line 40-1) on the opposite side of the trunk transmission line of the second packet B2-1 transmitted the period T2 earlier.

Thereafter, similarly, the first system central device 11-1 and the second system central device 11-2, first packets (A1-3 to A1-13) and second packets (B2-3 to B1-12) are generated, and these packets are transmitted to the first system trunk transmission line 40-1 and the second system trunk transmission line 40-2.

In the terminal device 16-1, packets surrounded by frames of dotted lines are received and train control information in the packets is transmitted to the devices (not shown in the figure). More specifically, when the same sequence number is given to the transmitted packets, the terminal device 16-1 performs processing for adopting the packet received first. For example, when the terminal device 16-1 receives the first packet A2-2 and the second packet B1-2 to which the same sequence number has been given, the terminal device 16-1 adopts the first packet A2-2 arriving first and discards the second packet B1-2 arriving second.

In FIG. 4(B), the first packets A1-1 to A1-13 transmitted to the first system trunk transmission line and the second system trunk transmission line by the conventional method represented by Patent Literature 1 are shown. On the upper side of FIG. 4(B), the first packets A1-1 to A1-13 transmitted to the first system trunk transmission line 40-1 are shown. On the lower side of FIG. 4(B), the first packets A2-1 to A2-13 transmitted to the second system trunk transmission line 40-2 are shown. In the conventional method, the first system central device 11-1, which is a master station, is used in common and the second system central device 11-2 is treated as an auxiliary. Therefore, when the first system central device 11-1 is not out of order, only the first packets A1 and A2 generated by the first system central device 11-1 are transmitted to the first system trunk transmission line 40-1 and the second system trunk transmission line 40-2. When the first system trunk transmission line 40-1 and the second system trunk transmission line 40-2 are normal, on a receiving device side, the first packet A1 of the first packets A1 and A2 transmitted through the first trunk transmission line 40-1 is adopted.

Figure 5:
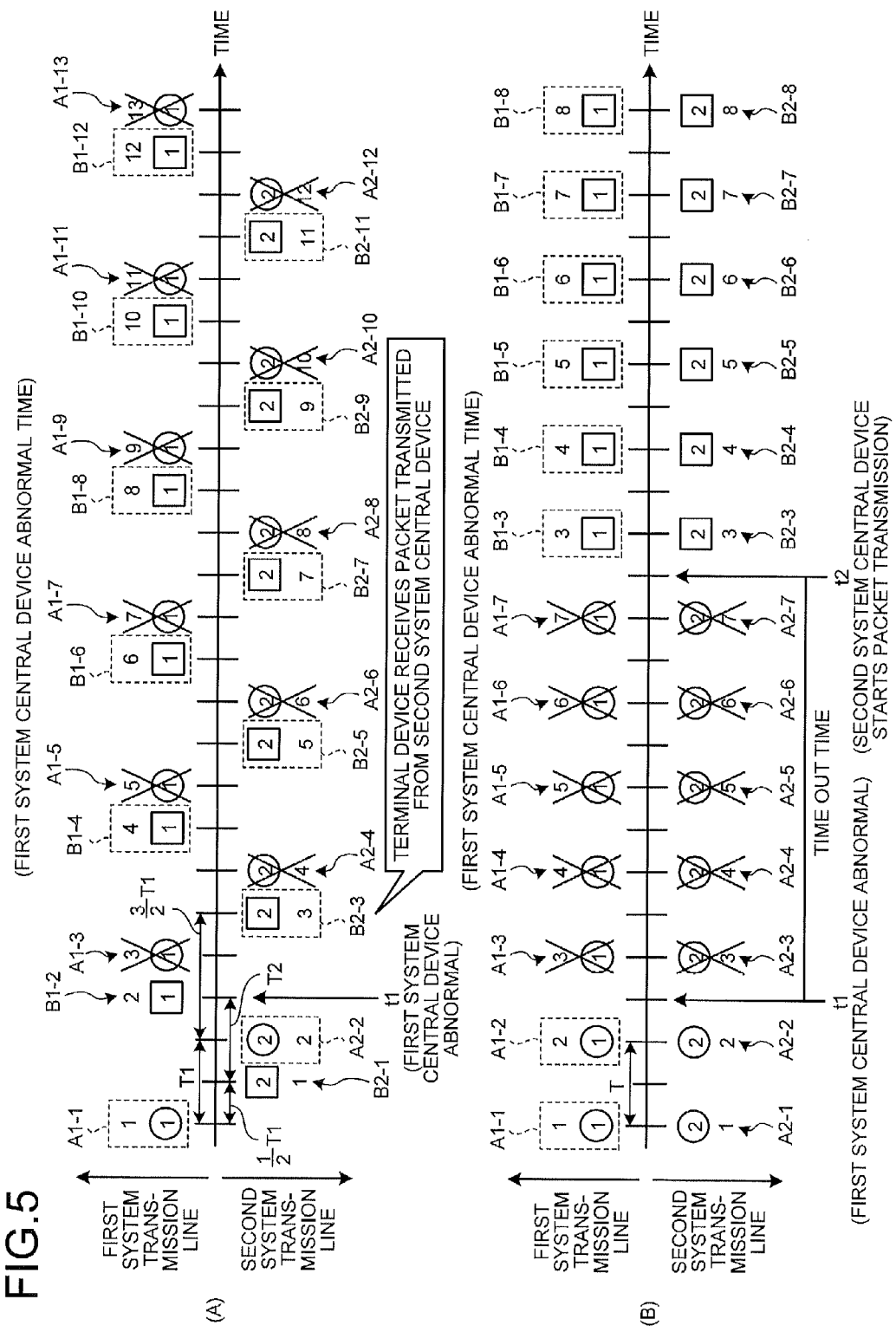
FIG. 5 is a diagram explaining packets transmitted when an abnormality occurs in a first system central device.

FIG. 5 is a diagram explaining a packet transmitted when an abnormality is generated in the first system central device.

In FIG. 5(A), the first packets A1 and A2 and the second packets B1 and B2 transmitted from the train information management apparatus according to the first embodiment to the first system trunk transmission line 40-1 and the second system trunk transmission line 40-2 are shown. In FIG. 5(A), a state is shown in which the first packets A1 and A2 are not transmitted to the first system trunk transmission line 40-1 and the second system trunk transmission line 40-2 because, for example, some abnormality has occurred in the first system central device 11-1 immediately after the second packet B1-2 is transmitted (at time 1).

When such an abnormality occurs, the first packets (A1-3, A2-4, etc.) after the second packet B1-2 are not transmitted. However, the second packets (B2-3, B1-4, etc.) are continuously transmitted.

In this case, in the terminal device 16-1, packets surrounded by frames of dotted lines are received and train control information in the packets to the devices (not shown in the figure) is transmitted. In an example shown in FIG. 5(A), the second packets (B2-3, B1-4, B2-5, etc.) after the first packet A2-2 are adopted. Note that the second packet B2-3 is transmitted when the time obtained by multiplying the period T1 with 3/2 has elapsed from a time point at which the first packet A2-2 was transmitted. However, the terminal device 16-1 also adopts packets arriving in time exceeding the period T1.

On the other hand, in FIG. 5(B), the first packets A1 and A2 transmitted by the conventional method explained above are shown. In an example shown in FIG. 5(B), a state is shown in which packets after the first packet A1-3 and the first packet A2-3 are not transmitted to the first system trunk transmission line 40-1 and the second system trunk transmission line 40-2 because an abnormality has occurred in the first system central device 11-1 immediately after the first packet A1-2 and the first packet A2-2 were transmitted. According to the conventional method, transmission of packets (in the example shown in FIG. 5(B), the second packet B1-3, the second packet B2-3, etc.) from the second system central device 11-2 is started at the time of timeout when a fixed time has elapsed from the time (at time t1) when the second system central device 11-2 cannot receive data from the first system central device 11-1. That is, a time lag occurs before the entity of data transmission is switched from the first system central device 11-1 to the second system central device 11-2. When such a time lag occurs, transmission of train control information to a car-mounted device is delayed. Therefore, it is likely that the operation of the train is significantly affected.

As a method of reducing such a time lag, a method is conceivable in which the first system central device 11-1 and the second system central device 11-2 mutually monitor their soundness and, when a failure of the first system central device 11-1 is detected, the first system central device 11-1 is switched to the second system central device 11-2 at a sufficiently short interval. However, in this method, it is necessary to add anew a transmission line for mutually monitoring their respective soundness. When the monitoring is performed using an existing transmission line, an increase in traffic of the existing transmission line is caused.

In the train information management apparatus according to the first embodiment, packets to which sequence numbers have been given are alternately transmitted to the doubled trunk transmission lines. Therefore, the time lag does not occur, a transmission line or the like for mutually monitoring their soundness is unnecessary, and an increase in traffic is not caused.

Figure 6:
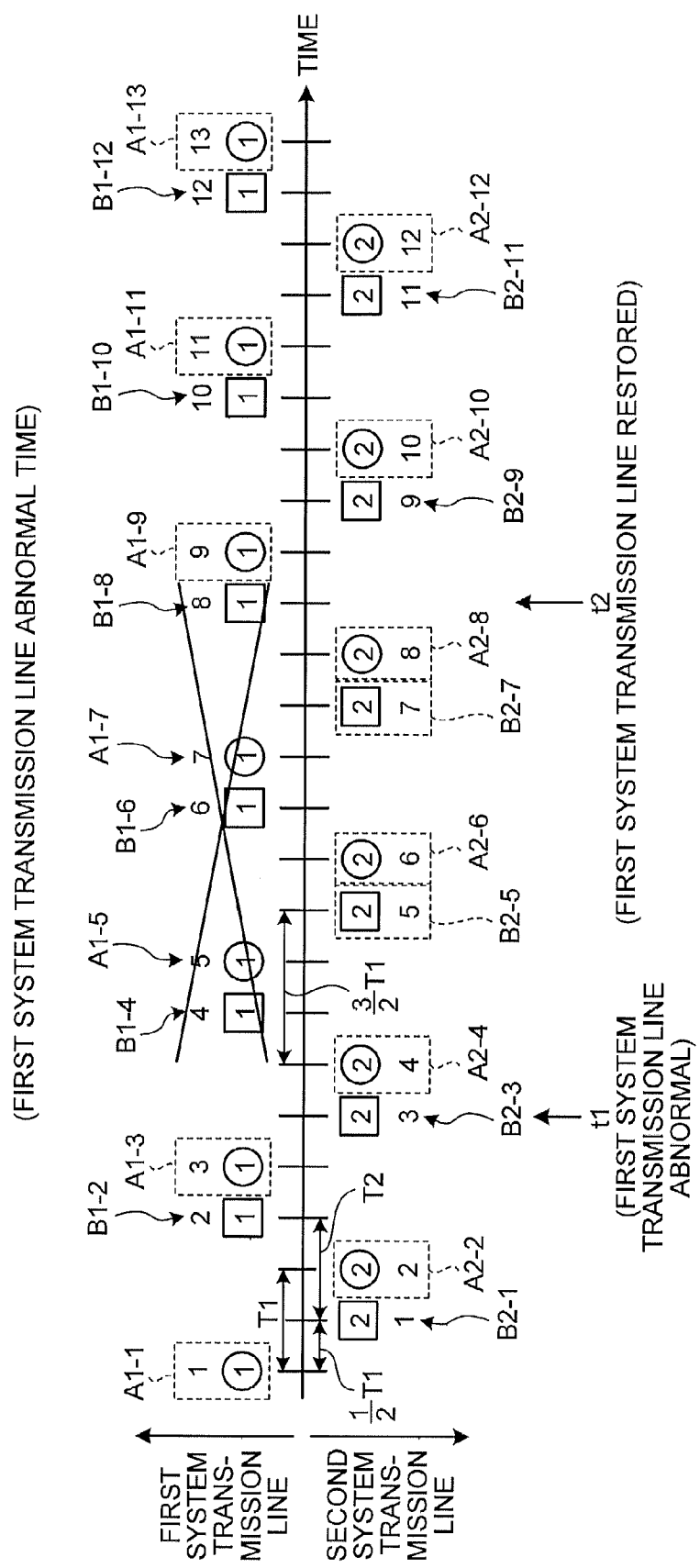
FIG. 6 is a diagram explaining packets transmitted when an abnormality occurs in a first system trunk transmission line.

FIG. 6 is a diagram explaining the packets transmitted when an abnormality has occurred in the first system trunk transmission line.

In FIG. 6, the first packets A1 and A2 and the second packets B1 and B2 transmitted from the train information management apparatus according to the first embodiment to the first system trunk transmission line 40-1 and the second system trunk transmission line 40-2 are shown. A state is shown in which, for example, the second packet B1-4 and the first packet A1-5 cannot be transmitted because, for example, an abnormality has occurred in the first system trunk transmission line 40-1 immediately after the first packet A1-3 was transmitted (at time t1).

When such an abnormality occurs, after the time t1, packets (the second packet B1-4, etc.), which should be transmitted to the first system trunk transmission line 40-1, are not transmitted. However, the packets can be continuously transmitted to the second system trunk transmission line 40-2.

In this case, the terminal device 16-1 receives packets surrounded by frames of dotted lines and transmits train control information in the packets to the devices (not shown in the figure). In an example shown in FIG. 6, after the first packet A2-4, the second packet B2-5, the first packet A2-6, the second packet B2-7, and the first packet A2-8 are adopted. After the first system trunk transmission line 40-1 is restored at time t2, the terminal device 16-1 adopts the first packets A1-9, A2-10, and the like. Note that the number same as the sequence number of the first packet A1-9 is given to the second packet B2-9 transmitted after the restoration. Therefore, the second packet B2-9 is discarded. The second packet B2-5 is generated when the time obtained by multiplying the period T1 with 3/2 has elapsed from a time point at which the first packet A2-4 was transmitted. However, the terminal device 16-1 adopts also the packets arriving in time exceeding the period T1.

Note that the control input information input to the first system central device 11-1 and the second system central device 11-2 can be, for example, operation control information of an electromagnetic valve of a brake control apparatus and information concerning a route in which the train operates, apart from the notch information from the master controller.

As explained above, the train information management apparatus according to the first embodiment includes the first system central device 11-1 connected to the first system trunk transmission line 40-1 disposed across a plurality of cars, which configure the formation of the train, and the second system trunk transmission line 40-2 disposed across a plurality of cars, which configure the formation of the train, and forming a redundant system of the first system trunk transmission line 40-1, the first system central device 11-1 including the first train-control-information generating unit (the train-control-information generating unit 51 in the first system transmission control unit 12-1) configured to generate, based on the control input information including the notch information, the first train control information serving as a control command signal for the devices mounted on the cars and the first packet generating unit (the packet generating unit 52 in the first system transmission control unit 12-1) configured to generate, every time the first train control information is generated, the first packets A1 and A2 in which the sequence numbers has been given to the first train control information, and alternately transmit, in every predetermined period T1, the first packets A1 and A2 to the first system trunk transmission line 40-1 and the second system trunk transmission line 40-2, and the second system central device 11-2 connected to the first system trunk transmission line 40-1 and the second system trunk transmission line 40-2, the second system central device 11-2 including the second train-control-information generating unit (the train-control-information generating unit 51 in the second system transmission control unit 12-2) configured to generate the second train control information, which is the train control information same as the first train control information, based on the control input information starting from the time at which the time obtained by multiplying the predetermined period T1 with 1/2 has elapsed from the time point at which the first train control information was transmitted, and the second packet generating unit (the packet generating unit 52 in the second system transmission control unit 12-2) configured to generate, every time the second train control information is generated, the second packets B1 and B2 in which the sequence numbers have been given to the second train control information and transmit, in every predetermined period T2, the second packets B1 and B2 to the trunk transmission line (e.g., the second system trunk transmission line 40-2) on the opposite side of the trunk transmission line (e.g., the first system trunk transmission line 40-1) to which the first packets A1 and A2 were transmitted. Therefore, unlike the related art, a time lag in switching the entity of data transmission from the first system central device to the second system central device does not occur. The transmission line or the like for the first system central device and the second system central device that mutually monitor their respective soundness is made unnecessary. As a result, it is possible to transmit to the devices without causing an increase in the traffic of the transmission lines.

Second Embodiment

The train information management apparatus according to the first embodiment is configured to increment the sequence number in every period T1. However, a train information management apparatus according to the second embodiment is configured to increment the sequence number in every half time of the period T1 when control input information that requires a rise of control frequency of devices (e.g., notch information from a master controller and operation control information of an electromagnetic valve of a brake control apparatus) is input. The train information management apparatus according to the second embodiment includes components same as the components shown in FIG. 1 and FIG. 2. In the following explanation, components same as the components of the train information management apparatus according to the first embodiment are denoted by the same reference numerals and sigs and explanation of the components is omitted. Only differences are explained.

First, the train-control-information generating unit 51 and the packet generating unit 52 according to the second embodiment 2 is explained with reference to FIG. 2.

The train-control-information generating unit 51 in the first system central device 11-1 generates first train information control information based on control input information.

For example, when a first piece of first train control information is generated, the packet generating unit 52 in the first system transmission control unit 12-1 generates the first packet A1 in which a sequence number has been given to the first train control information. The first packet A1 is transmitted to, for example, the first system trunk transmission line 40-1.

When a second piece of first train control information is generated, the packet generating unit 52 in the first system transmission control unit 12-1 gives a number obtained by adding 2 to the preceding sequence number to the first train control information and generates the first packet A2. The first packet A2 is transmitted to a trunk transmission line (e.g., the second system trunk transmission line 40-2) on the opposite side of the trunk transmission line to which the first packet A1 was transmitted.

Thereafter, in the packet generating unit 52 in the first system transmission control unit 12-1, every time the first train control information is generated, the first packets A1 and A2 to which numbers obtained by adding 2 to the preceding sequence numbers have been given are generated. The packet generating unit 52 transmits the first packets A1 and A2 to a trunk transmission line on the opposite side of a trunk transmission line to which the packets A1 and A2 were transmitted last time.

Subsequently, the train-control-information generating unit 51 in the second system transmission control unit 12-2 generates second train control information, which is information different from the first train control information, based on control input information starting from the time at which a half time of the period T1 has elapsed from a time point at which the first packet A1 was transmitted.

For example, when a first piece of second train control information is generated, the packet generating unit 52 in the second system transmission control unit 12-2 generates the second packet B2 in which a sequence number has been given to the second train control information. The second packet B2 is transmitted to, for example, the second system trunk transmission line 40-2.

When a second piece of second train control information is generated, the packet generating unit 52 in the second system transmission control unit 12-2 gives a number obtained by adding 2 to the preceding sequence number to the second train control information and generates the second packet B1. The second packet B1 is transmitted to a trunk transmission line (e.g., the first system trunk transmission line 40-1) on the opposite side of the trunk transmission line to which the second packet B2 was transmitted.

Thereafter, the packet generating unit 52 in the second system transmission control unit 12-2 generates, every time the second train control information is generated, the second packets B1 and B2 to which numbers obtained by adding 2 to the preceding sequence numbers have been given. The second packets B1 and B2 are transmitted to a trunk transmission line on the opposite side of a trunk transmission line to which the second packets B1 and B2 were transmitted last time.

The operation of the train information management apparatus in the second embodiment is explained below.

Figure 7:
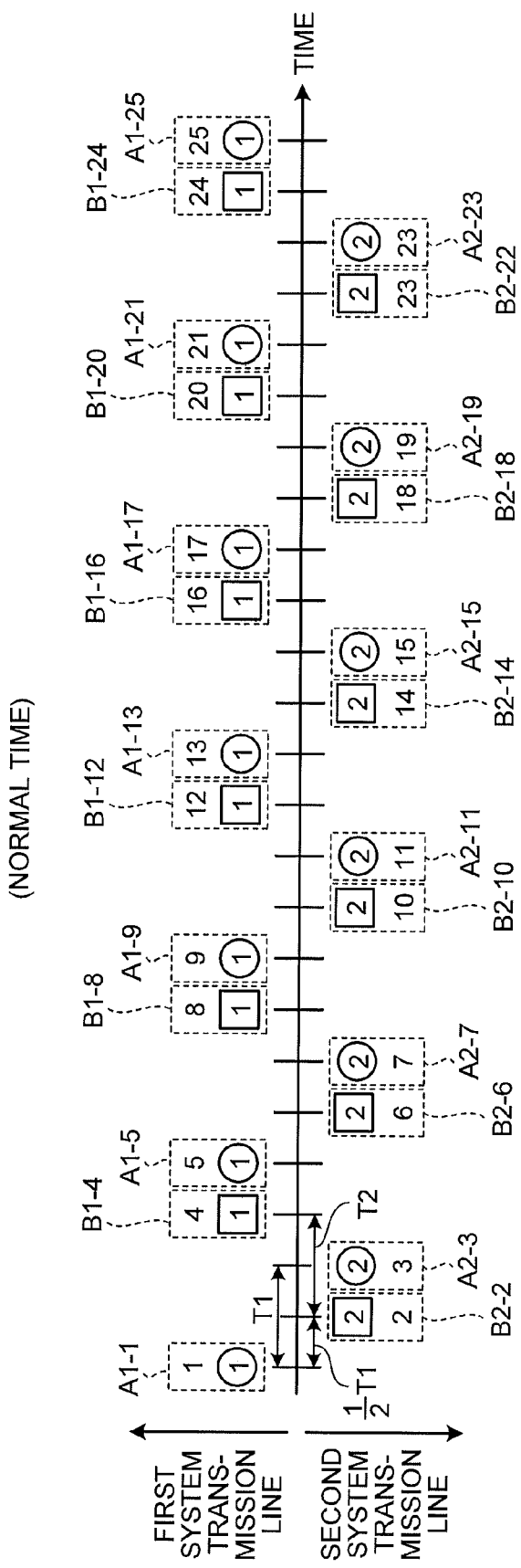
FIG. 7 is a diagram explaining the operation of a train information management apparatus according Advantageous Effects of Invention g to a second embodiment of the present invention.

FIG. 7 is a diagram for explaining the operation of the train information management apparatus according to the second embodiment of the present invention. In FIG. 7, packets transmitted when the central devices and the trunk transmission lines are normal are shown. On the upper side of FIG. 7, the first packet A1 and the second packet B1 transmitted to the first system trunk transmission line 40-1 are shown. On the lower side of FIG. 7, the second packet B2 and the first packet A2 transmitted to the second system trunk transmission line 40-2 are shown.

The first system central device 11-1, the first packet A1-1 in which the sequence number "1" has been given to the first train control information "1" is generated at a predetermined time. The first packet A1-1 is transmitted to, for example, the first system trunk transmission line 40-1.

Subsequently, when the time obtained by multiplying the period T1 with 1/2 has elapsed from a time point at which the first packet A1-1 was transmitted, the second system central device 11-2 generates the second train control information "2" and generates a second packet B2-2 in which the sequence number "2" obtained by adding 1 to the sequence number of the first packet A1-1 has been given to the second train control information "2". The second train control information "2" has content different from that of the first train control information of the first packet A1-1. The second packet B2-2 is transmitted to a trunk transmission line (the second system trunk transmission line 40-2) on the opposite side of the trunk transmission line to which the first packet A1-1 was transmitted.

Subsequently, after the period T1 has elapsed from the time point at which the first packet A1-1 was generated, in the first system central device 11-1, the first train control information "2" is generated, and the first packet A2-3 in which a sequence number "3" obtained by adding 2 to the sequence number "1" of the first packet A1-1 has been given to the first train control information "2" is generated. The first train control information "2" is generated anew based on control input information. Then, the first packet A2-3 is transmitted to a trunk transmission line (the second system trunk transmission line 40-2) on the opposite side of the trunk transmission line to which the first packet A1-1 was transmitted the period T1 earlier.

Subsequently, after the period T2 has elapsed from the time point at which the second packet B2-2 was generated, in the second system central device 11-2, the second train control information "1" is generated and the second packet B1-4 in which a sequence number "4" obtained by adding 2 to the sequence number of the second packet B2-2 has been given to the second train control information "1" is generated. The second train control information "1" has content different from that of the first train control information of the first packet A2-3. The second packet B1-4 is transmitted to a trunk transmission line (e.g., the first system trunk transmission line 40-1) on the opposite side of the trunk transmission line of the second packet to which B2-2 was transmitted the period T2 earlier.

Thereafter, similarly, the first system central device 11-1 and the second system central device 11-2 generate first packets (A1-5 to A1-25) and second packets (B2-6 to B1-24). These packets are transmitted to the first system trunk transmission line 40-1 and the second system trunk transmission line 40-2.

The terminal device 16-1 receives first packets and second packets surrounded by frames of dotted lines and transmits train control information in the packets to devices (not shown in the figure).

Figure 8:
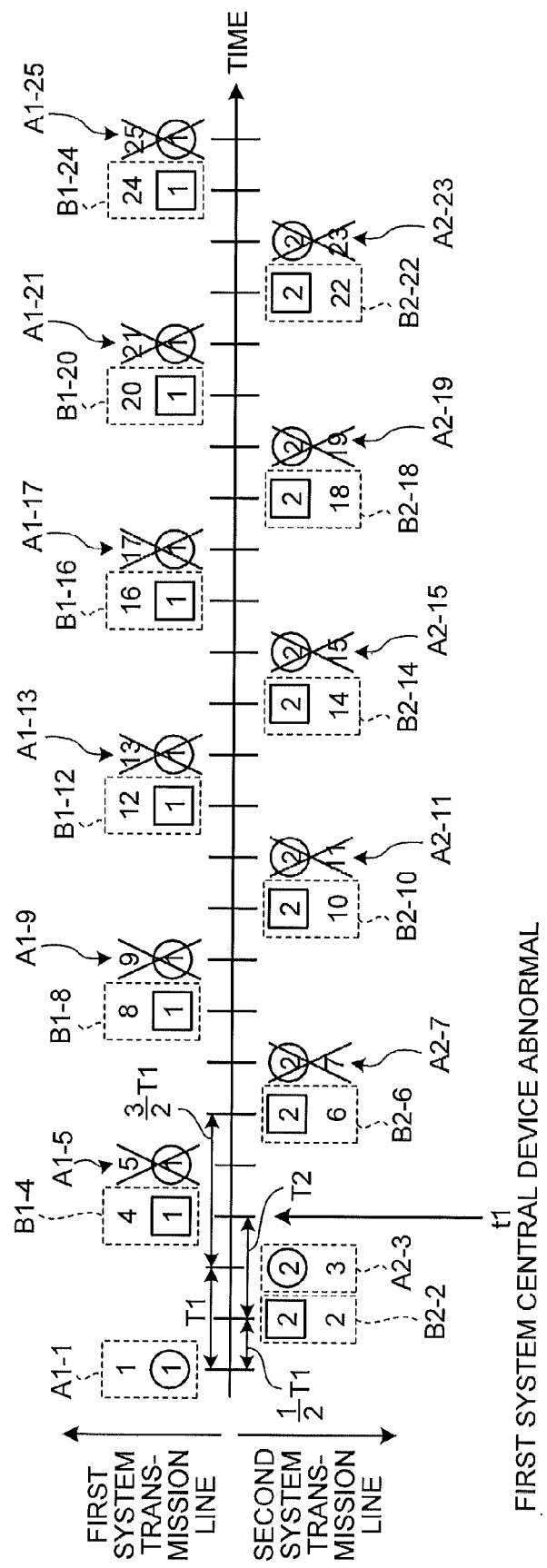
FIG. 8 is a diagram explaining packets transmitted when an abnormality occurs in a first system central device according to the second embodiment.

FIG. 8 is a diagram explaining packets transmitted when an abnormality has occurred in the first system central device according to the second embodiment. In FIG. 8, the first packets A1 and A2 and the second packets B1 and B2 transmitted from the train information management apparatus according to the second embodiment to the first system trunk transmission line 40-1 and the second system trunk transmission line 40-2 are shown. A state is shown in which the first packets A1 and A2 are not transmitted to the first system trunk transmission line 40-1 and the second system trunk transmission line 40-2 because, for example, some abnormality has occurred in the first system central device 11-1 immediately after the second packet B1-4 was transmitted (at the time t1).

When such an abnormality has occurred, the first packets (A1-5, A2-7, etc.) after the time t1 are not transmitted. However, the second packets (B2-6, B1-8, etc.) are continuously transmitted.

In this case, the terminal device 16-1 receives packets surrounded by frames of dotted lines and transmits train control information in the packets to devices. In an example shown in FIG. 8, the second packets (B2-6, B1-8, etc.) after the first packet A1-5 are adopted. Note that the second packet B2-6 is transmitted when time obtained by multiplying the period T1 with 3/2 has elapsed from the time point at which the first packet A2-3 was transmitted. However, the terminal device 16-1 adopts also such packets arriving in time exceeding the period T1.

Figure 9:
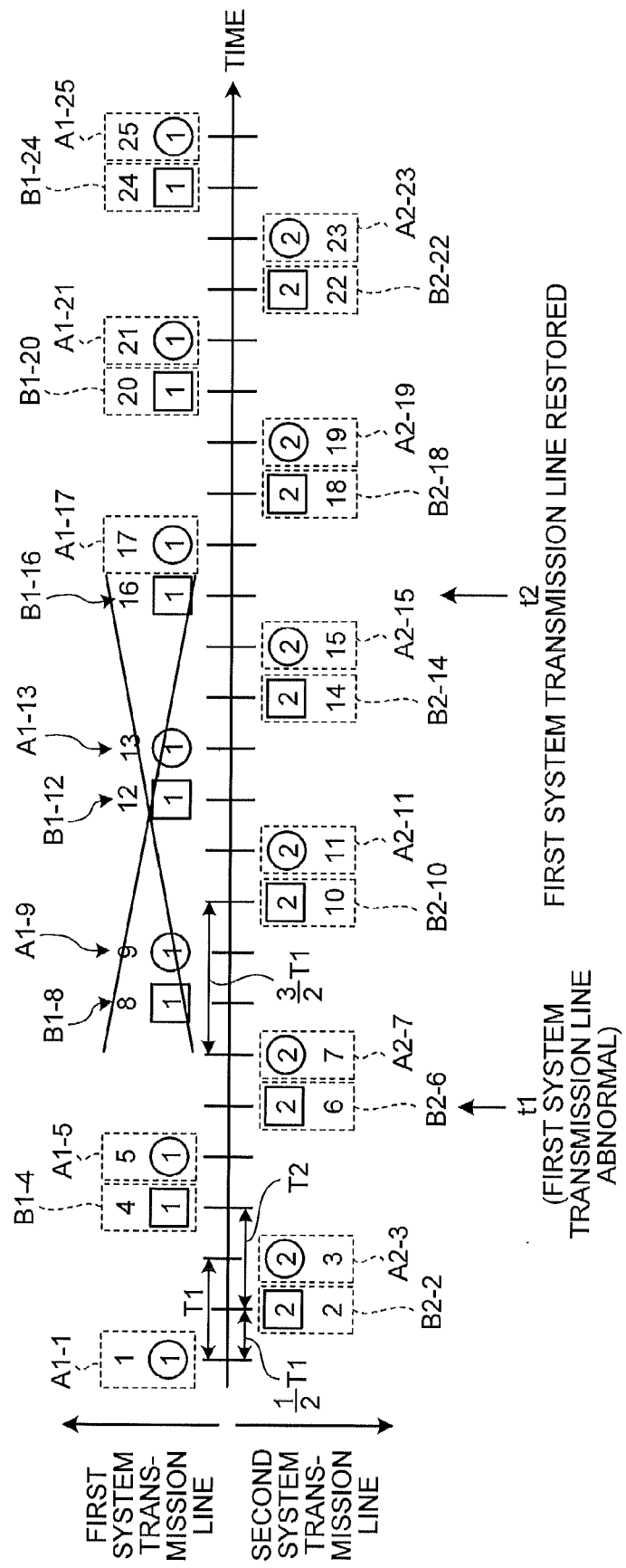
FIG. 9 is a diagram explaining packets transmitted when an abnormality occurs in a first system trunk transmission line according to the second embodiment.

FIG. 9 is a diagram explaining packets transmitted when an abnormality has occurred in the first system trunk transmission line according to the second embodiment. In FIG. 9, the first packets A1 and A2 and the second packets B1 and B2 transmitted from the train information management apparatus according to the second embodiment to the first system trunk transmission line 40-1 and the second system trunk transmission line 40-2 are shown. A state is shown in which, for example, the second packet B1-8 and the first packet A1-9 cannot be transmitted because, for example, an abnormality occurs in the first system trunk transmission line 40-1 immediately after the first packet A2-7 was transmitted (at time t1).

When such an abnormality occurs, after the time t1, packets (the second packet B1-8, etc.), which should be transmitted to the first system trunk transmission line 40-1, are not transmitted. However, the packets can be continuously transmitted to the second system trunk transmission line 40-2.

In this case, the terminal device 16-1 receives packets surrounded by frames of dotted lines and transmits train control information in the packets to the devices (not shown in the figure). In an example shown in FIG. 9, the second packet B2-10, the first packet A2-11, the second packet B2-14, the first packet A2-15, and the like are adopted. When the first system trunk transmission line 40-1 is restored at the time t2, the terminal device 16-1 adopts the first packet A1-17, the second packet B2-18, and the like. Note that the second packet B2-10 is generated when the time obtained by multiplying the period T1 with 3/2 has elapsed from the time point at which the first packet A2-7 was transmitted. However, the terminal device 16-1 adopts packets arriving in time exceeding the period T1.

Note that, in the second embodiment, as an example of the control input information, a case in which the control input information that requires a rise of control frequency is input. However, the control input information used in the train information management apparatus according to the second embodiment can be information that does not require a rise of control frequency.

Note that, in the example explained with reference to FIG. 7, the second train control information "2" generated when the time obtained by multiplying the period T1 with 1/2 has elapsed from the time point at which the first packet A1-1 was transmitted has content different from that of the first train control information of the first packet A1-1. However, the second train control information "2" is not limited to this. That is, the second train control information "2" generated when the time obtained by multiplying the period T1 with 1/2 has elapsed from the time point at which the first packet A1-1 was transmitted can have same content as that of the first train control information of the first packet A1-1. Similarly, the second train control information "1" generated after the period T2 has elapsed from the time point at which the second packet B2-2 was generated can have same content as that of the first train control information of the first packet A2-3. By configuring the train information management apparatus in this way, effects same as those explained above are obtained.

As explained above, in the train information management apparatus according to the second embodiment, the packet generating unit (the first packet generating unit) 52 in the first system transmission control unit 12-1 increments the sequence number by 2 every time the first train control information is generated, generates, as the first packets A1 and A2, the packets in which the sequence number has been given to the first train control information, and alternately transmits, in every predetermined period T1, the first packets A1 and A2 to the first system trunk transmission line 40-1 and the second system trunk transmission line 40-2. The packet generating unit (the second packet generating unit) 52 in the second system transmission control unit 12-2 increments the sequence number by 2 every time the second train control information is generated, generates, as the second packets B1 and B2, the packets in which the sequence number has been given to the second train control information, and transmits, in every predetermined time T", the second packets B1 and B2 to a trunk transmission line on the opposite side of the trunk transmission line to which the first packets A1 and A2 were transmitted. Therefore, the sequence number is incremented in every half time of the period T1. For example, when the control input information is information that requires a rise of control frequency of the devices (e.g., notch information from the master controller), the train information management apparatus according to the second embodiment can control the devices (e.g., a VVVF) in a period shorter than the period in the first embodiment. In this way, in addition to the effects in the first embodiment, the train information management apparatus according to the second embodiment can improve operation accuracy of the devices.

As explained above, the first system central device 11-1 according to the first and second embodiments is configured to alternately transmit the first packets A1 and A2 in which the sequence numbers have been given to the first train control information to the first system trunk transmission line 40-1 and the second system trunk transmission line 40-2. The second system central device 11-2 according to the first and second embodiments is configured to transmit the second packets B1 and B2 in which the sequence numbers have been given to the second train control information to the trunk transmission line on the opposite side of the trunk transmission line to which the first packets A1 and A2 were transmitted.

The first system central device 11-1 and the second system central device 11-2 according to the first and second embodiments configured as explained above can be configured as explained below.

Figure 10:
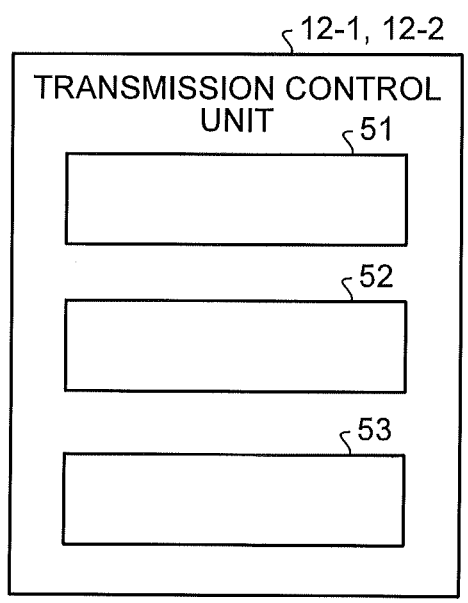
FIG. 10 is a diagram showing another configuration example of a first system transmission control unit and a second system transmission control unit.

FIG. 10 is a diagram of another configuration example of the first system transmission control unit 12-1 and the second system transmission control unit 12-2. The first system transmission control unit 12-1 and the second system transmission control unit 12-2 shown in FIG. 10 includes a packet-generation-system selecting unit 53 together with the train-control-information generating unit 51 and the packet generating unit 52 shown in FIG. 2. Only differences from FIG. 2 are explained.

The packet-generation-system selecting unit 53 selects, based on control input information input from the first system central device 11-1 and the second system central device 11-2, one of a packet generation system (a first packet generation system) of the train information management apparatus according to the first embodiment and a packet generation system (a second packet generation system) of the train information management apparatus according to the second embodiment. That is, when the control input information input to the train-control-information generating unit 51 in the first system transmission control unit 12-1 and the train-control-information generating unit 51 in the second system transmission control unit 12-2 is first information that does not require a rise of control frequency of the devices (e.g., setting information of an air conditioning temperature from a motorman's cab), the packet-generation-system selecting unit 53 selects the first packet generation system for incrementing the sequence number by 1 every time the first train control information is generated and incrementing the sequence number by 1 every time the second train control information is generated. When the control input information input to the train-control-information generating unit 51 in the first system transmission control unit 12-1 and the train-control-information generating unit 51 in the second system transmission control unit 12-2 is second information that requires a rise of control frequency of the devices (information directly related to traveling control for the train, for example, notch information from the master controller), the packet-generation-system selecting unit 53 selects the second packet generation system for incrementing the sequence number by 2 every time the first train control information is generated and incrementing the sequence number by 2 every time the second train control information is generated.

Specifically, the packet-generation-system selecting unit 53 determines whether the control input information is the first information or the second information. When the control input information is the second information, the packet-generation-system selecting unit 53 selects the second packet generation system. That is, the packet-generation-system selecting unit 53 controls the packet generating unit 52 such that the sequence number is incremented in every half time of the period T. As a result, the sequence numbers are incremented as shown in FIG. 7. A device (e.g., a VVVF) that receives packets to which the sequence numbers have been given is controlled in every half time of the period T1.

On the other hand, when the control input information is the first information, the packet-generation-system selecting unit 53 selects the first packet generation system. That is, the packet-generation-system selecting unit 53 controls the packet generating unit 52 such that the sequence numbers are incremented at every interval of the period T1. As a result, the sequence numbers are incremented as shown in FIG. 4(A). A device (e.g., an air conditioner) that receives packets to which the sequence numbers have been given is controlled in every period T1. The time when there is much noise (during power running, etc.) or a place that has much vibration (a curve or the like is acquired and detected from route information) can be a trigger for switching.

Note that the control information that requires a rise of control frequency of the devices can be, for example, speed limit information included in route information concerning a route on which the train operates or speed limit information from a ground facility disposed in the route apart from the notch information from the master controller.

As explained above, when the control input information is the information that does not require a rise of control frequency of the devices, the first system central device 11-1 according to the first and second embodiment is configured to increment the sequence numbers by 1 every time the first train control information is generated anew (in every period T1) and transmit, as the first packets A1 and A2, packets in which the sequence numbers are given to the first train control information. The second system central device 11-2 is configured to increment the sequence numbers by 1 every time the second train control information is generated anew (in every period T2) and transit, as the second packets B1 and B2, packets in which the sequence numbers have been given to the second train control information. To the contrary, when the control input information is information that requires a rise of control frequency of the devices, the first system central device 11-1 according to the first and second embodiments is configured to increment the sequence numbers by 2 every time the first train control information is generated anew (in every period T1) and transmit, as the first packets A1 and A2, packets in which the sequence numbers have been given to the first train control information. The second system central device 11-2 is configured to increment the sequence numbers by 2 every time the second train control information is generated anew and transmit, as the second packets B1 and B2, packets in which the sequence numbers have been given to the second train control information. By configuring the train information management apparatus in this way, when the control input information that requires a rise of control frequency of the devices is input, it is possible to improve operation accuracy of the devices. When the information that does not require a rise of control frequency of the devices is input, it is possible to control the devices while suppressing an increase in the traffic of the trunk transmission lines and the like.

Note that, in the examples explained in the first and second embodiments, the first system central device 11-1 and the second system central device 11-2 are mounted on the first car of the train formation. However, the mounting place of the first system central device 11-1 and the second system central device 11-2 is not limited to this.

The train information management apparatuses according to the first and second embodiments are connected to the doubled transmission lines extending between cars (e.g., transmission lines extending between the first car and a car other than the first car) and connected to the doubled intra-car transmission lines. Therefore, information and the like from the devices are output by these transmission lines, whereby redundancy increases and higher reliability is obtained.

Note that, in FIG. 3, in order to simplify the explanation, the terminal device 16-1 is shown as an example of a device that receives train control information. However, the device that receives the train control information can be either the terminal device 16-2 or the devices (not shown in the figure).

Note that, in the example explained above, when the first system central device 11-1 shown in FIG. 1 is regarded as the first information transmitting unit, the second system central device 11-2 shown in FIG. 1 is regarded as the second information transmitting unit, and the terminal device 16-1 or the terminal device 16-2 shown in FIG. 1 is regarded as the receiving device, the first system central device 11-1 and the second system central device 11-2 are set as transmission sources of the first packet A1 and the second packet B2 and the terminal device 16-1 or the terminal device 16-2 is set as a transmission destination of the first packet A1 and the second packet B2. However, transmission sources and transmission destinations are not limited to this. Combinations of the transmission sources and the transmission destinations are explained below.

A first combination is explained. In the train information management apparatuses according to the first and second train information management apparatuses, for example, when the terminal device 16-1 shown in FIG. 1 is regarded as the first information transmitting unit, the terminal device 16-2 shown in FIG. 1 is regarded as the second information transmitting unit, and the devices (not shown in the figure) are regarded as receiving devices, the terminal device 16-1 and the terminal device 16-2 can be set as the transmission sources and the devices can be set as the transmission destinations. When the terminal device 16-1 and the terminal device 16-2 are set as the transmission sources, for example, the terminal device 16-1 includes the first train-control-information generating unit (the train-control-information generating unit 51 in the first system transmission control unit 12-1) and the first packet generating unit (the packet generating unit 52 in the first system transmission control unit 12-1). The terminal device 16-2 includes the second train-train-control-information generating unit (the train-control-information generating unit 51 in the second system transmission control unit 12-2) and the second packet generating unit (the packet generating unit 52 in the second system transmission control unit 12-2).

A second combination is explained. For example, when it is assumed that a device (not shown in the figure) is a safety device such as an ATC device and the safety device is doubled in the same manner as the first system central device 11-1 and the second system central device 11-2, one safety device is a first device and the other safety device is a second device. It is assumed that the first device and the second device are respectively connected to the hub 22-1 and the hub 22-2 shown in FIG. 1. In such a configuration, in the train information management apparatuses according to the first and second embodiments, for example, when the first device is regarded as the first information transmitting unit, the second device is regarded as the second information transmitting unit, and the terminal device 16-1 and the terminal device 16-2 shown in FIG. 1 are regarded as the receiving devices, the first device and the second device can be set as the transmission sources and the terminal device 16-1 and the terminal device 16-2 can be set as the transmission destinations. When the first device and the second device are set as the transmission sources, for example, the first device includes the first train-control-information generating unit and the first packet generating unit and the second device includes the second train-control-information generating unit and the second packet generating unit.

A third combination is explained. In the train information management apparatuses according to the first and second embodiments, the devices (not shown in the figure) can be set as the transmission sources and the first system central device 11-1 or the second system central device 11-2 can be set as the transmission destination. The transmission sources in this case are the first device and the second device as in the second combination. The first device includes the first train-control-information generating unit and the first packet generating unit. The second device includes the second train-control-information generating unit and the second packet generating unit.

A fourth combination is explained. In the train information management apparatuses in the first and second embodiments, the terminal device 16-1 and the terminal device 16-2 can be set as the transmission sources and the first system central device 11-1 or the second system central device 11-2 can be set as the transmission destination. The transmission sources in this case are the terminal device 16-1 and the terminal device 16-2 as in the first combination. The terminal device 16-1 includes the first train-control-information generating unit and the first packet generating unit. The terminal device 16-2 includes the second train-control-information generating unit and the second packet generating unit.

A fifth combination is explained. In the train information management apparatuses according to the first and second embodiments, the terminal device 16-1 and the terminal device 16-2 shown in FIG. 1 can be set as the transmission sources and not-shown terminal devices can be set as the transmission destinations. The terminal devices set as the transmission destinations are, for example, terminal devices equivalent to the terminal device 16-1 and the terminal device 16-2 shown in FIG. 1 and respectively connected to the first system trunk transmission line 40-1 and the second system trunk transmission line 40-2 via hubs (not shown in the figure) equivalent to the hub 23-1 and the hub 23-2. The terminal device 16-1 includes the first train-control-information generating unit and the first packet generating unit. The terminal device 16-2 includes the second train-control-information generating unit and the second packet generating unit.

A sixth combination is explained. In the train information management apparatuses according to the first and second embodiments, for example, when the central devices 11-1 and 11-2 shown in FIG. 1 are regarded as the terminal devices (16-1 and 16-2) and the terminal devices 16-1 and 16-2 shown in FIG. 1 are regarded as the first device and the second device, the terminal device (16-1) is set as the first information transmitting unit, the terminal device (16-2) is set as the second information transmitting unit, and the first device and the second device are set as the receiving devices. The terminal devices (16-1 and 16-2) can be set as the transmission sources and the first device and the second device can be set as the transmission destinations. When the terminal devices (16-1 and 16-2) are set as the transmission sources, the terminal device (16-1) includes the first train-control-information generating unit (the train-control-information generating unit 51 in the first system transmission control unit 12-1) and the first packet generating unit (the packet generating unit 52 in the first system transmission control unit 12-1). The terminal device (16-2) includes the second train-control-information generating unit (the train-control-information generating unit 51 in the second system transmission control unit 12-2) and the second packet generating unit (the packet generating unit 52 in the second system transmission control unit 12-2).

A seventh combination is explained. In the train information management apparatuses according to the first and second embodiments, when the central devices 11-1 and 11-2 shown in FIG. 1 are regarded as the terminal devices (16-1 and 16-2) and the terminal devices 16-1 and 16-2 shown in FIG. 1 are regarded as the first device and the second device, the first device is set as the first information transmitting unit, the second device is set as the second information transmitting unit, and the terminal devices (16-1 and 16-2) are set as the receiving devices. The first device and the second device can be set as the transmission sources and the terminal devices (16-1 and 16-2) can be set as the transmission destinations. When the first device and the second device are set as the transmission sources in this way, the first device includes the first train-control-information generating unit (the train-control-information generating unit 51 in the first system transmission control unit 12-1) and the first packet generating unit (the packet generating unit 52 in the first system transmission control unit 12-1). The second device includes the second train-control-information generating unit (the train-control-information generating unit 51 in the second transmission control unit 12-2) and the second packet generating unit (the packet generating unit 52 in the second system transmission control unit 12-2).

Note that the train information management apparatuses explained in the first and second embodiments indicate an example of content of the present invention. It goes without saying that the train information management apparatuses can be combined with still other publicly-known technologies and can be configured to be changed, for example, partially omitted without departing from the spirit of the present invention.

INDUSTRIAL APPLICABILITY

As explained above, the present invention is applicable to a train information management apparatus applied to a train in which trunk transmission lines are doubled and, in particular, useful as an invention capable of transmitting train control information without increasing the traffic of the trunk transmission lines.

REFERENCE SIGNS LIST

11-1 First system central device
11-2 Second system central device
12-1 First system transmission control unit
12-2 Second system transmission control unit
16-1, 16-2 Terminal devices
22-1, 22-2, 23-1, 23-2 Hubs
40-1 First system trunk transmission line (first trunk transmission line)
40-2 Second system trunk transmission line (second trunk transmission line)
51 Train-control-information generating unit (first train-control-information generating unit, second train-control-information generating unit)
52 Packet generating unit (first packet generating unit, second packet generating unit)
53 Packet-generation-system selecting unit
A1, A2 First packets
B1, B2 Second packets

The invention claimed is:

1. A train information management apparatus comprising:
a first information transmitter connected to a first trunk transmission line disposed across a plurality of cars, which configure a formation of a train, and a second trunk transmission line disposed across a plurality of cars, which configure the formation of the train, and forming a redundant system of the first trunk transmission line, the first information transmitter including a first train-control-information generator configured to generate, based on control input information including notch information, first train control information serving as a control command signal for a receiving device mounted on the car and a first packet generator configured to increment a sequence number by 1, every time the first train control information is generated, and generate a first packet in which the sequence number has been given to the first train control information and alternately transmit, in every predetermined period, the first packet to the first trunk transmission line and the second trunk transmission line; and
a second information transmitter connected to the first trunk transmission line and the second trunk transmission line, the second information transmitter including a second train-control-information generator configured to generate second train control information, which is train control information same as or different from the first train control information, based on the control input information starting from the time at which the time obtained by multiplying the predetermined period with 1/2 has elapsed from a time point at which the first train control information was transmitted, and a second packet generator configured to generate, every time the second train control information is generated, a second packet in which a sequence number same as the sequence number given to the first packet has been given to the second train control information and transmit, in the every predetermined period, the second packet to a trunk transmission line on the opposite side of the trunk transmission line to which the first packet was transmitted.

2. The train information management apparatus according to claim 1, wherein the first information transmitter and the second information transmitter are connected to doubled transmission lines extending between cars and connected to doubled intra-car transmission lines.

3. The train information management apparatus according to claim 1, wherein each of the first information transmitter and the second information transmitter includes a packet-generation-system selector configured to select, when the control input information input to the first train-control-information generator and the second train-control-information generator is first information that does not require a rise of control frequency of the receiving device, a first packet generation system for incrementing the sequence number by 1 every time the first train control information is generated and for incrementing the sequence number by 1 every time the second train control information is generated, and configured to select, when the control input information input to the first train-control-information generator and the second train-control-information generator is second information that requires a rise of control frequency of the receiving device, a second packet generation system for incrementing the sequence number by 2 every time the first train control information is generated and incrementing the sequence number by 2 every time the second train control information is generated.

4. The train information management apparatus according to claim 1, wherein
each of the first information transmitter and the second information transmitter includes a packet-generation-system selector configured to select, when the control input information input to the first train-control-information generator and the second train-control-information generator is first information that does not require a rise of control frequency of the receiving device, a first packet generation system for incrementing the sequence number by 1 every time the first train control information is generated and for incrementing the sequence number by 1 every time the second train control information is generated, and configured to select, when the control input information input to the first train-control-information generator and the second train-control-information generator is second information that requires a rise of control frequency of the receiving device, a second packet generation system for incrementing the sequence number by 2 every time the first train control information is generated and incrementing the sequence number by 2 every time the second train control information is generated,
the first packet generator increments, when the control input information is the first information, the sequence number by 1 every time the first train control information is generated, and generates, as the first packet, a packet in which the sequence number has been given to the first train control information, and increments, when the control input information is the second information, the sequence number by 2 every time the first train control information is generated and generates, as the first packet, a packet in which the sequence number has been given to the first train control information, and
the second packet generator increments, when the control input information is the first information, the sequence number by 1 every time the second train control information is generated, and generates, as the second packet, a packet in which the sequence number has been given to the second train control information and increments, when the control input information is the second information, the sequence number by 2 every time the second train control information is generated, and generates, as the second packet, a packet in which the sequence number has been given to the second train control information.

5. The train information management apparatus according to claim 4, wherein the packet-generation-system selector controls, when the control input information input to the first train-control-information generator and the second train-control-information generator is the first information, the first packet generator and the second packet generator such that the sequence number is incremented at any interval of the predetermined period and controls, when the control input information input to the first train-control-information generator and the second train-control-information generator is the second information, the first packet generator and the second packet generator such that the sequence number is incremented at every half time of the predetermined period.

6. A train information management apparatus comprising:
a first information transmitter connected to a first trunk transmission line disposed across a plurality of cars, which configure a formation of a train, and a second trunk transmission line disposed across a plurality of cars, which configure the formation of the train, and forming a redundant system of the first trunk transmission line, the first information transmitter including a first train-control-information generator configured to generate, based on control input information including notch information, first train control information serving as a control command signal for a receiving device mounted on the car and a first packet generator configured to increment a sequence number by 2 every time the first train control information is generated, and generate a first packet in which the sequence number has been given to the first train control information and alternately transmit, in the every predetermined period, the first packet to the first trunk transmission line and the second trunk transmission line; and
a second information transmitter connected to the first trunk transmission line and the second trunk transmission line, the second information transmitter including a second train-control-information generator configured to generate second train control information, which is train control information same as or different from the first train control information, based on the control input information starting from the time at which the time obtained by multiplying the predetermined period with 1/2 has elapsed from the time point at which the first train control information was transmitted and a second packet generator configured to generate, every time the second train control information is generated, a second packet in which a sequence number obtained by incrementing the sequence number given to the first packet by 1 has been given to the second train control information and transmit, in the every predetermined period, the second packet to a trunk transmission line on the opposite side of the trunk transmission line to which the first packet was transmitted.

7. The train information management apparatus according to claim 6, wherein
each of the first information transmitter and the second information transmitter includes a packet-generation-system selector configured to select, when the control input information input to the first train-control-information generator and the second train-control-information generator is first information that does not require a rise of control frequency of the receiving device, a first packet generation system for incrementing the sequence number by 1 every time the first train control information is generated and for incrementing the sequence number by 1 every time the second train control information is generated, and configured to select, when the control input information input to the first train-control-information generator and the second train-control-information generator is second information that requires a rise of control frequency of the receiving device, a second packet generation system for incrementing the sequence number by 2 every time the first train control information is generated and incrementing the sequence number by 2 every time the second train control information is generated, the first packet generator increments, when the control input information is the first information, the sequence number by 1 every time the first train control information is generated, and generates, as the first packet, a packet in which the sequence number has been given to the first train control information, and increments, when the control input information is the second information, the sequence number by 2 every time the first train control information is generated and generates, as the first packet, a packet in which the sequence number has been given to the first train control information, and the second packet generator increments, when the control input information is the first information, the sequence number by 1 every time the second train control information is generated, and generates, as the second packet, a packet in which the sequence number has been given to the second train control information and increments, when the control input information is the second information, the sequence number by 2 every time the second train control information is generated, and generates, as the second packet, a packet in which the sequence number has been given to the second train control information.

8. The train information management apparatus according to claim 7, wherein the packet-generation-system selector controls, when the control input information input to the first train-control-information generator and the second train-control-information generator is the first information, the first packet generator and the second packet generator such that the sequence number is incremented at any interval of the predetermined period and controls, when the control input information input to the first train-control-information generator and the second train-control-information generator is the second information, the first packet generator and the second packet generator such that the sequence number is incremented at every half time of the predetermined period.

9. The train information management apparatus according to claim 6, wherein the first information transmitter and the second information transmitter are connected to doubled transmission lines extending between cars and connected to doubled intra-car transmission lines.

10. The train information management apparatus according to claim 6, wherein each of the first information transmitter and the second information transmitter includes a packet-generation-system selector configured to select, when the control input information input to the first train-control-information generator and the second train-control-information generator is first information that does not require a rise of control frequency of the receiving device, a first packet generation system for incrementing the sequence number by 1 every time the first train control information is generated and for incrementing the sequence number by 1 every time the second train control information is generated, and configured to select, when the control input information input to the first train-control-information generator and the second train-control-information generator is second information that requires a rise of control frequency of the receiving device, a second packet generation system for incrementing the sequence number by 2 every time the first train control information is generated and incrementing the sequence number by 2 every time the second train control information is generated.

11. A train information management method applicable to a first information transmitter connected to a first trunk transmission line disposed across a plurality of cars, which configure a formation of a train, and a second trunk transmission line disposed across a plurality of cars, which configure the formation of the train, and forming a redundant system of the first trunk transmission line, the train information management method comprising:

a first train-control-information generating step of generating, based on control input information including notch information, first train control information serving as a control command signal for a receiving device mounted on the car;

a first packet generating step of incrementing a sequence number by 1, every time the first train control information is generated, and generating a first packet in which the sequence number has been given to the first train control information;

a step of alternately transmitting, in every predetermined period, the first packet to the first trunk transmission line and the second trunk transmission line;

a second train-control-information generating step of generating second train control information, which is train control information same as or different from the first train control information, based on the control input information starting from the time at which the time obtained by multiplying the predetermined period with 1/2 has elapsed from the time point at which the first train control information was transmitted;

a second packet generating step of generating, every time the second train control information is generated, a second packet in which a sequence number same as the sequence number given to the first packet has been given to the second train control information; and a step of transmitting, in the every predetermined period, the second packet to a trunk transmission line on the opposite side of the trunk transmission line to which the first packet was transmitted.

12. The train information management method according to claim 11, wherein before each of the first information transmitting step and the second information transmitting step, the train information management method includes a packet-generation-system selecting step of selecting, when the control input information is first information that does not require a rise of control frequency of the receiving device, a first packet generation system for incrementing the sequence number by 1 every time the first train control information is generated and incrementing the sequence number by 1 every time the second train control information is generated and selecting, when the control input information is second information that requires a rise of control frequency of the receiving device, a second packet generation system for incrementing the sequence number by 2 every time the first train control information is generated, and incrementing the sequence number by 2 every time the second train control information is generated, the first packet generating step includes a step of incrementing, when the control input information is the first information, the sequence number at every interval of the predetermined period, and generating, as the first packet, a packet in which the sequence number has been given to the first train control information and a step of incrementing, when the control input information is the second information, the sequence number at every half time of the predetermined period, and generating, as the first packet, a packet in which the sequence number has been given to the first train control information, and the second packet generating step includes a step of incrementing, when the control input information is the first information, the sequence number at ever interval of the predetermined period and generating, as the second packet, a packet in which the sequence number is given to the second train control information and incrementing, when the control input information is the second information, the sequence number at every half time of the predetermined period, and generating, as the second packet, a packet in which the sequence number has been given to the second train control information.

13. The train information management method according to claim 11, wherein before each of the first information transmitting step and the second information transmitting step, the train information management method includes a packet-generation-system selecting step of selecting, when the control input information is first information that does not require a rise of control frequency of the receiving device, a first packet generation system for incrementing the sequence number by 1 every time the first train control information is generated and incrementing the sequence number by 1 every time the second train control information is generated and selecting, when the control input information is second information that requires a rise of control frequency of the receiving device, a second packet generation system for incrementing the sequence number by 2 every time the first train control information is generated, and incrementing the sequence number by 2 every time the second train control information is generated.

14. A train information management method applicable to a first information transmitter connected to a first trunk transmission line disposed across a plurality of cars, which configure a formation of a train, and a second trunk transmission line disposed across a plurality of cars, which configure the formation of the train, and forming a redundant system of the first trunk transmission line, the train information management method comprising:
   a first train-control-information generating step of generating, based on control input information including notch information, first train control information serving as a control command signal for a receiving device mounted on the car;
   a first packet generating step of incrementing a sequence number by 2 every time the first train control information is generated and generating a first packet in which the sequence number has been given to the first train control information;
   a step of alternately transmitting, in every predetermined period, the first packet to the first trunk transmission line and the second trunk transmission line;
   a second train-control-information generating step of generating second train control information, which is train control information same as or different from the first train control information, based on the control input information starting from the time at which the time obtained by multiplying the predetermined period with 1/2 has elapsed from the time point at which the first train control information was transmitted;
   a second packet generating step of generating, every time the second train control information is generated, a second packet in which a sequence number obtained by incrementing the sequence number given to the first packet by one has been given to the second train control information; and
   a step of transmitting, in the every predetermined period, the second packet to a trunk transmission line on the opposite side of the trunk transmission line to which the first packet was transmitted.

15. The train information management method according to claim 14, wherein
   before each of the first information transmitting step and the second information transmitting step, the train information management method includes a packet-generation-system selecting step of selecting, when the control input information is first information that does not require a rise of control frequency of the receiving device, a first packet generation system for incrementing the sequence number by 1 every time the first train control information is generated and incrementing the sequence number by 1 every time the second train control information is generated and selecting, when the control input information is second information that requires a rise of control frequency of the receiving device, a second packet generation system for incrementing the sequence number by 2 every time the first train control information is generated and incrementing the sequence number by 2 every time the second train control information is generated,
   the first packet generating step includes a step of incrementing, when the control input information is the first information, the sequence number at every interval of the predetermined period, and generating, as the first packet, a packet in which the sequence number has been given to the first train control information and a step of incrementing, when the control input information is the second information, the sequence number at every half time of the predetermined period, and generating, as the first packet, a packet in which the sequence number has been given to the first train control information, and
   the second packet generating step includes a step of incrementing, when the control input information is the first information, the sequence number at every interval of the predetermined period and generating, as the second packet, a packet in which the sequence number is given to the second train control information and incrementing, when the control input information is the second information, the sequence number at every half time of the predetermined period, and generating, as the second packet, a packet in which the sequence number has been given to the second train control information.

16. The train information management method according to claim 14, wherein before each of the first information transmitting step and the second information transmitting step, the train information management method includes a packet-generation-system selecting step of selecting, when the control input information is first information that does not require a rise of control frequency of the receiving device, a first packet generation system for incrementing the sequence number by 1 every time the first train control information is generated and incrementing the sequence number by 1 every time the second train control information is generated and selecting, when the control input information is second information that requires a rise of control frequency of the receiving device, a second packet generation system for incrementing the sequence number by 2 every time the first train control information is generated and incrementing the sequence number by 2 every time the second train control information is generated.

* * * * *